(12) United States Patent
Schroeder et al.

(10) Patent No.: US 6,460,734 B1
(45) Date of Patent: *Oct. 8, 2002

(54) DISPENSING APPARATUS INCLUDING A PUMP PACKAGE SYSTEM

(75) Inventors: Alfred A. Schroeder; Michael T. Romanyszyn, Jr.; Samuel Durham, all of San Antonio, TX (US)

(73) Assignee: Lancer Partnership, San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/694,173

(22) Filed: Aug. 8, 1996

Related U.S. Application Data

(63) Continuation-in-part of application No. 08/444,164, filed on May 18, 1995, which is a continuation-in-part of application No. 08/178,721, filed on Jan. 10, 1994, now Pat. No. 5,494,193, which is a division of application No. 07/843,757, filed on Feb. 28, 1992, now Pat. No. 5,305,923, which is a continuation of application No. 07/752,406, filed on Aug. 30, 1991, now abandoned, which is a continuation-in-part of application No. 07/715,433, filed on Jun. 14, 1991, now abandoned, which is a continuation-in-part of application No. 07/634,857, filed on Dec. 27, 1990, now abandoned, which is a continuation-in-part of application No. 07/534,601, filed on Jun. 6, 1990, now abandoned.

(51) Int. Cl.$^7$ ................................................. B67D 5/56
(52) U.S. Cl. .............................. 222/129.1; 222/145.5; 222/145.6; 222/256; 222/327; 222/389; 222/262; 222/383.2
(58) Field of Search ............................ 222/1, 95, 105, 222/129.1, 135, 137, 145.1, 145.5–145.6, 252, 256, 258, 325, 326, 327, 386, 387, 389, 390, 23, 52, 63, 262, 383.2; 418/48

(56) References Cited

U.S. PATENT DOCUMENTS

| | | | | |
|---|---|---|---|---|
| 2,028,407 | A | * | 1/1936 | Moinequ |
| 2,312,544 | A | * | 3/1943 | Gould et al. |
| 2,532,145 | A | * | 11/1950 | Byrum |
| 2,603,162 | A | * | 7/1952 | Lloyd |
| 2,612,845 | A | * | 10/1952 | Byram et al. |
| 2,686,613 | A | * | 8/1954 | Tamminga |
| 2,691,347 | A | * | 10/1954 | Zimmer, Jr. |
| 2,822,152 | A | * | 2/1958 | Knudsen |
| 2,826,152 | A | * | 3/1958 | Michie |
| 3,459,337 | A | * | 8/1969 | Williamson |
| 3,529,749 | A | * | 9/1970 | Lehmann et al. |
| 3,803,870 | A | * | 4/1974 | Conz .................... 222/135 |
| 4,096,971 | A | * | 6/1978 | Kuchens |
| 4,325,682 | A | * | 4/1982 | Willis |
| 4,818,197 | A | * | 4/1989 | Mueller |
| 5,305,923 | A | * | 4/1994 | Kirschner et al. |
| 5,494,193 | A | * | 2/1996 | Kirschner et al. |

* cited by examiner

Primary Examiner—Kenneth Bomberg
(74) Attorney, Agent, or Firm—Christopher L. Makay

(57) ABSTRACT

A unitary one-piece, disposable package includes a canister for storing a product. A pump housing formed integrally with the canister contains a progressive cavity pump that pumps product from the canister to an outlet chamber of the pump housing and out an outlet from the chamber. A product dispenser for use with the unitary one-piece, disposable package includes a housing, a chamber in the housing for receiving the package, and a motor within the housing for driving the progressive cavity pump of the package.

21 Claims, 11 Drawing Sheets

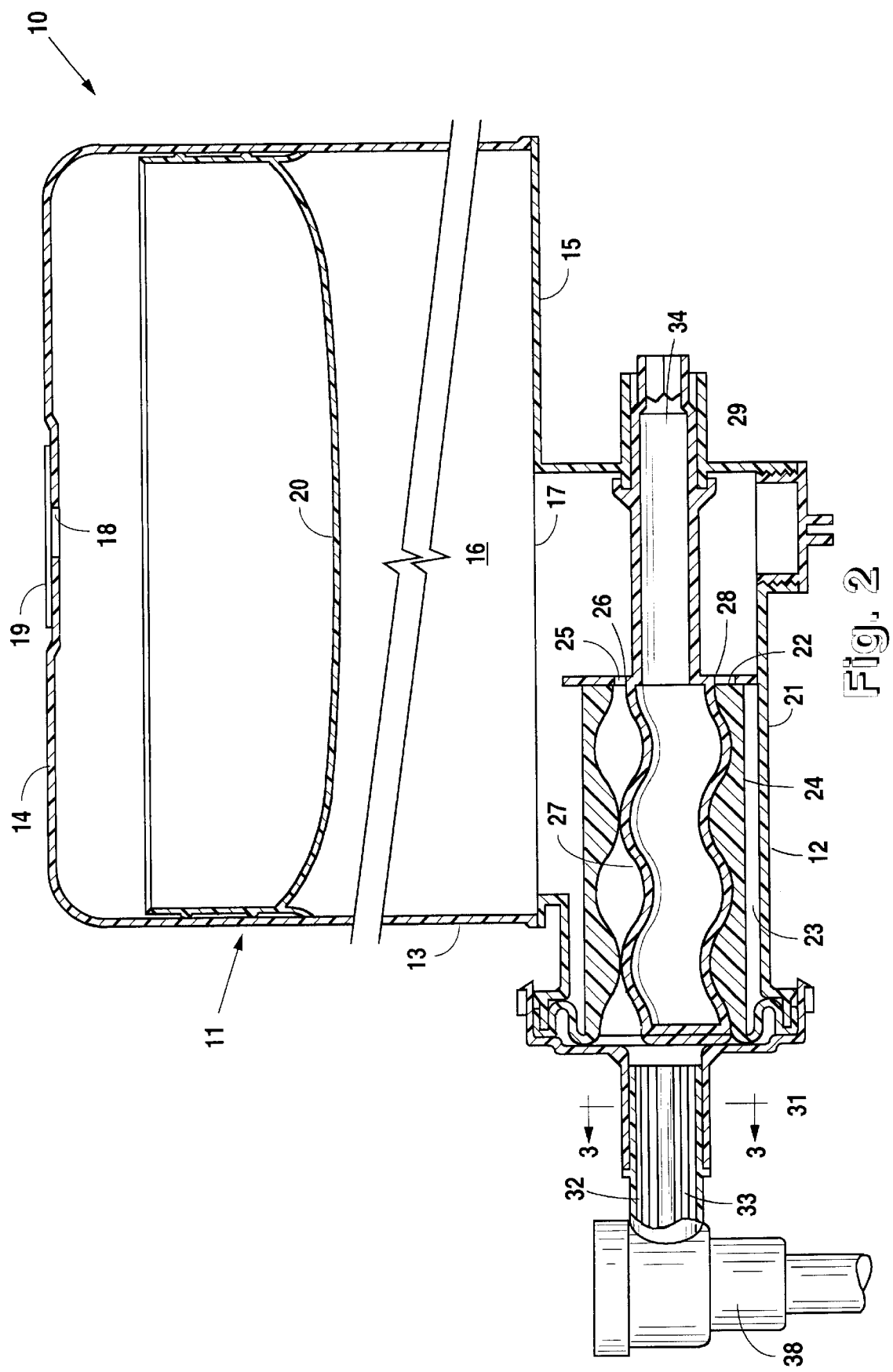

DISPENSING APPARATUS INCLUDING A PUMP PACKAGE SYSTEM

CROSS-REFERENCE TO RELATED APPLICATIONS

This is a continuation-in-part of U.S. patent application Ser. No. 08/444,164 filed May 18, 1995, which is a continuation-in-part of U.S. patent application Ser. No. 08/178,721 filed Jan. 10, 1994 (now U.S. Pat. No. 5,494,193), which is a divisional of U.S. patent application Ser. No. 07/843,757 filed Feb. 28, 1992 (now U.S. Pat. No. 5,305,923), which is a continuation of U.S. patent application Ser. No. 07/752,406 filed Aug. 30, 1991 (now abandoned) and having the same title, which is in turn a continuation-in-part of U.S. patent application Ser. No. 07/634,857 filed Dec. 27, 1990 and a Continuation In Part Ser. No. 07/534,601 filed Jun. 6, 1990 with the same title (now abandoned), and is also a continuation-in-part to U.S. patent application entitled "Progressive Cavity Pump" filed Jun. 14, 1991 Ser. No. 07/715,433 (now abandoned).

BACKGROUND OF THE INVENTION

1. Field of the Invention

The present invention relates to dispensing equipment and, more particularly, but not by way of limitation, to a pump and package system utilized in dispensing equipment that dispenses food products, such as ice cream, mustard, ketchup, mayonnaise, soup, salad dressing, and the like.

2. Description of the Related Art

The viscosity of food products varies widely and ranges from hard (e.g., ice creams) to semi-liquids (e.g., ketchup and mustard) to liquids (e.g., soups). Hard ice cream typically comes in cartons that are stored in a freezer accessible to ice cream shop employees. An employee manually lifts the ice cream from its carton using a scoop and then places it on a cone or in a dish. The disadvantages of manual dispensing are that the ice cream remains uncovered for long periods and employees often contact the ice cream which is unsanitary.

Ketchup and mustard usually have separate dispensers that consist of a container having a pump. Although employees do not directly dispense ketchup and mustard, an employee must fill the dispensers when they are empty. That results in direct employee contact with both the dispensers and the ketchup and mustard. Furthermore, if the dispensers are not routinely cleaned or are cleaned improperly, an unsanitary condition situation arises.

Employees normally prepare soups on site by mixing a soup concentrate with water. An employee places the soup in a heated cauldron and then ladles the soup into containers for customer consumption. Thus, soups also contact employees and are open to the environment thereby allowing the spread of bacteria and germs.

Accordingly, an apparatus that permits the self-contained dispensing of food products, such as ice cream, mustard, ketchup, mayonnaise, soup, salad dressing, and the like, will improve sanitary conditions in the food service industry.

SUMMARY OF THE INVENTION

In accordance with the present invention, a unitary one-piece, disposable package includes a canister for storing a product. The canister includes a fill opening, a fill cap for the fill opening, and a piston for forcing product from the canister. A pump housing formed integrally with the canister contains a progressive cavity pump that pumps product from the canister to an outlet chamber of the pump housing and out an outlet from the chamber.

The pump housing includes an intermediate wall defining a stator chamber. The stator chamber contains a stator of the progressive cavity pump that communicates with the outlet chamber of the pump housing. The progressive cavity pump includes a rotor within said stator having a shaft connectable to a motor drive shaft. The rotor includes a conduit therethrough that communicates with the outlet chamber of said pump housing. The rotor further includes vanes at the opposite end of the rotor shaft that extend into the outlet chamber of the pump housing.

A product dispenser for use with the unitary one-piece, disposable package includes a housing, a chamber in the housing for receiving the package, and a motor within the housing for driving the progressive cavity pump of the package. The product dispenser includes within the housing either a refrigeration unit for refrigerating the chamber or a heating element for heating the chamber. The product dispenser further includes a system mounted within the housing for forcing product from the canister into the pump housing.

An alternative product dispenser includes a housing having a chamber for receiving a product canister wherein the chamber facilitates communication of product from the canister to a pump chamber. A progressive cavity pump mounts within the pump chamber for pumping product from the canister out an outlet from the pump chamber. A motor within the housing drives the progressive cavity pump. The alternative product dispenser includes within the housing either a refrigeration unit for refrigerating the chamber or a heating element for heating the chamber. The product dispenser further includes a system mounted within the housing for forcing product from the canister into the progressive cavity pump.

It is, therefore, an object of the present invention to provide a unitary one-piece, disposable package with a progressive cavity pump capable of pumping viscous products.

It is another object of the present invention that the package including the progressive cavity pump be inexpensive and disposable.

It is a further object of the present invention to provide a dispenser with a progressive cavity pump that pumps product from a disposable canister placed in the dispenser.

Still other objects, features, and advantages of the present invention will become evident to one of ordinary skill in the art in light of the following.

BRIEF DESCRIPTION OF THE DRAWINGS

FIG. 2 is a partial right side elevation view in cross-section illustrating a first embodiment of a canister including a progressive cavity pump formed integrally therewith.

DETAILED DESCRIPTION OF THE PREFERRED EMBODIMENT

Figure 1:
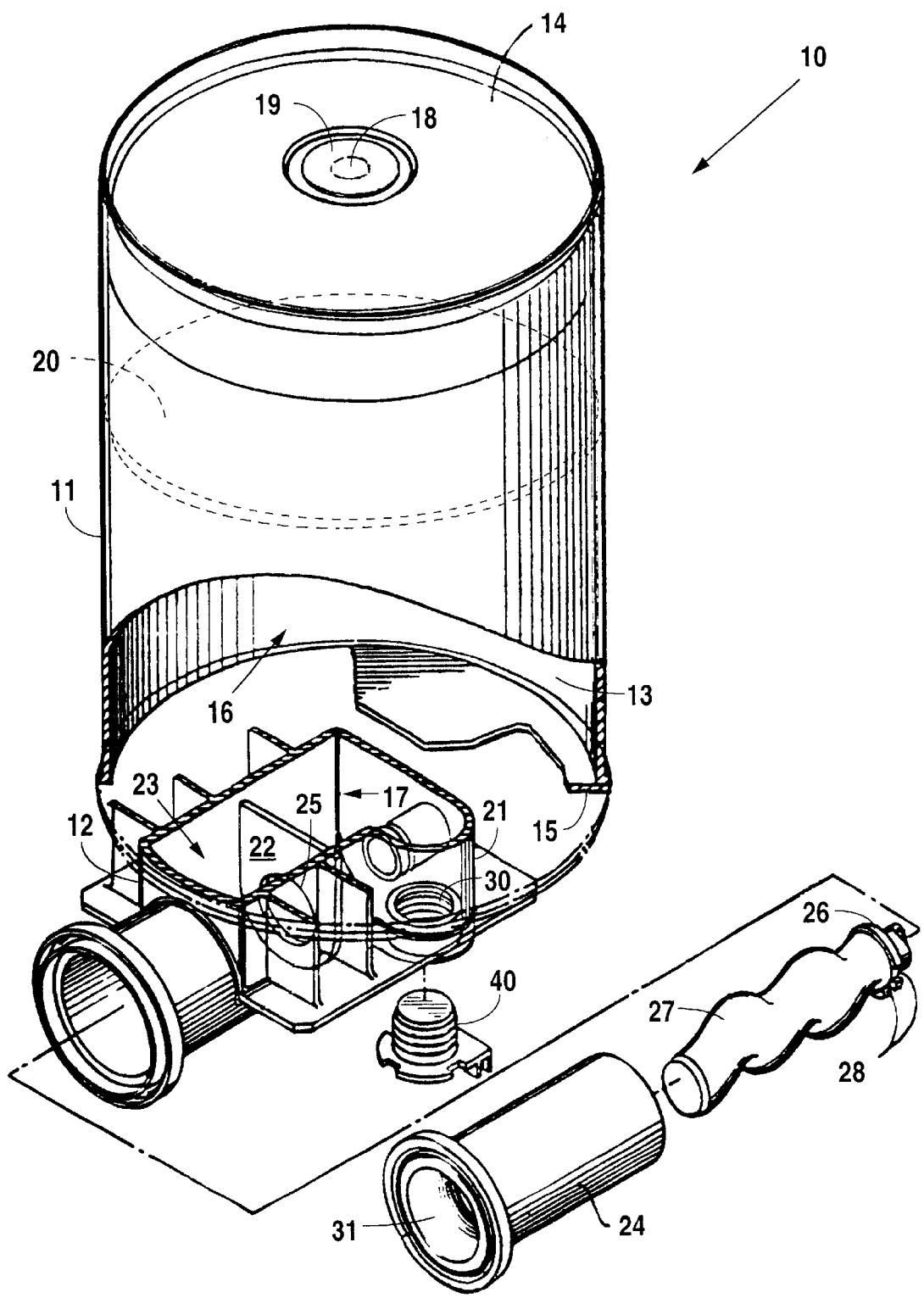
FIG. 1 is a perspective view in partial cross-section illustrating a first embodiment of a canister including a progressive cavity pump formed integrally therewith.
Figure 3:
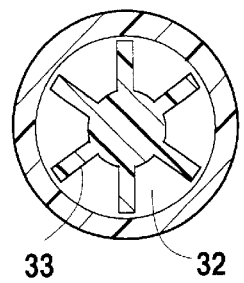
FIG. 3 is a front elevation view along lines 3—3 of FIG. 2 illustrating the vanes mounted at the front of the progressive cavity pump rotor.

FIGS. 1–3 illustrate a first embodiment of a one-piece unitary package 10. One-piece unitary package 10 includes a canister 11 and a progressive cavity pump 12. The canister 11 has a cylindrical side wall 13, a top wall 14, a bottom wall 15, a product chamber 16, and a product outlet 17. The canister 11 preferably includes an opening 18 in the top wall 14 thereof covered by a label 19 that may be pierced to permit the introduction of a pressurized fluid into the canister 11. The opening 18 is not essential because the fluid could alternatively be introduced through the top wall 14 after it has been punctured. The canister 11 includes a piston 20 that is forced down by the fluid pressure to push the product into the pump 12. Although canister 11 has been described with the piston 20 operated by fluid pressure, the piston 20 is not essential because the fluid pressure could be applied directly to the product. Furthermore, certain less viscous products, such as ketchup, mustard, and soup concentrate, will enter the pump 12 under the force of gravity, thus eliminating the necessity for the introduction of fluid pressure into canister 11.

In the preferred embodiments, the canister 11 is injection molded of polyethylene with a wall thickness of about 0.060 inch. The canister 11 is then hot plate welded to the pump 12, which is also injection molded of polyethylene. The package 10 is designed for upside-down orientation during shipping. The canister 11 is filled through an opening 30 adjacent the pump 12. A cap 40 seals the opening 30 after filling.

While other types of pumps could be used in package 10, the pump 12 in the preferred embodiments is a progressive cavity pump. The pump 12 includes a housing 21 having an intermediate wall 22 to define a stator chamber 23. A stator 24 abuts the wall 22. The wall 22 has an opening 25 that is a bearing for a ring 26 of a rotor 27. The ring 26 has openings or serrations 28 in its periphery that provide product inlet openings into the pump 12. The rotor 27 includes a shaft 34 that connects to any suitable dispenser drive unit, such as a motor, to facilitate the rotation of rotor 27. The rotor shaft 34 includes a labyrinth seal 29 where it rotatably extends through the housing 21. The rotor 27 further includes vanes 33 that break pumped product into segments to reduce the back pressure on the stator 24. The stator 24 moves or flexes sideways during pumping by virtue of the flexible seal 31 to avoid the necessity of an expensive constant velocity joint in the pump 12.

In operation, the piston 20 forces product into the pump 12 through the product outlet 17. The product enters the stator 24 through the openings or serrations 28 of the ring 26 where the rotor 27 pumps the product to a chamber 32. As the rotor 27 rotates, progressive cavities formed between the stator 24 and the rotor 27 move the product to the chamber 32. The vanes 33 of the rotor 27 extend into the chamber 32 to break the pumped product into segments thereby reducing the back pressure on the stator 24. The product exits the chamber 32 and passes into outlet 38 for dispensing into an appropriate container.

Figure 4:
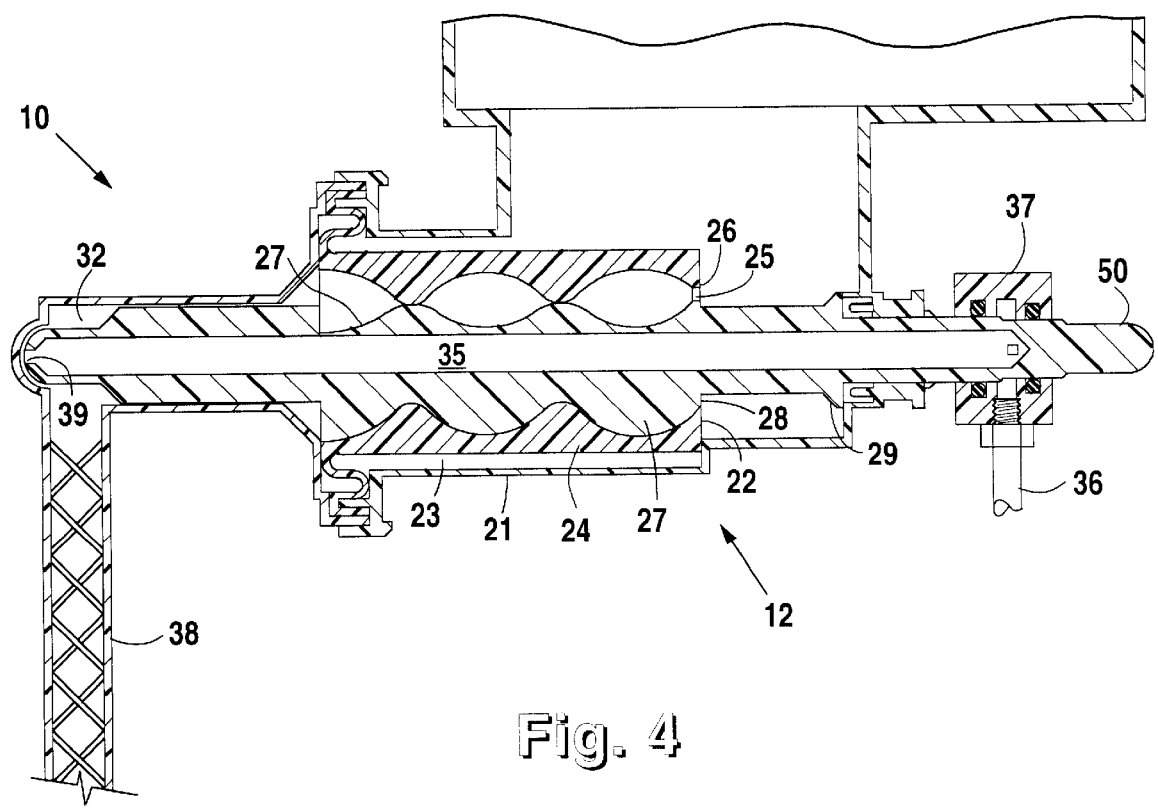
FIG. 4 is a partial right side elevation view in cross-section illustrating a second embodiment of a canister including a progressive cavity pump formed integrally therewith that permits mixing of a mixing fluid with product in the canister.

FIG. 4 illustrates a second embodiment of the unitary one-piece package 10 with like parts being referenced with like numerals. The pump 12 includes a housing 21 having an intermediate wall 22 to define a stator chamber 23. A stator 24 abuts the wall 22. The stator 24 moves or flexes sideways during pumping by virtue of a flexible seal 31 to avoid the necessity of an expensive constant velocity joint in the pump 12. The wall 22 has an opening 25 that is a bearing for a ring 26 of a rotor 27. The ring 26 has openings or serrations 28 in its periphery that provide product inlet openings into the pump 12. The rotor 27 includes a shaft 34 that connects to any suitable dispenser drive unit, such as a motor, to facilitate the rotation of rotor 27. The rotor shaft 34 includes a labyrinth seal 29 where it rotatably extends through the housing 21. The rotor 27 further includes vanes 33 that break pumped product into segments to reduce the back pressure on the stator 24. A conduit 35 extends completely through the rotor 27 including the rotor shaft 34 and the vanes 33 to deliver a mixing fluid into a chamber 32 via an opening 39. A fluid line 36 connects to a mixing fluid source and to a fluid block 37 communicating with the conduit 35 to deliver mixing fluid into the conduit 35.

In operation, the piston 20 forces product into the pump 12 through the product outlet 17. The product enters the stator 24 through opening 25 where the rotor 27 pumps the product to the chamber 32. As the rotor 27 rotates, progressive cavities formed between the stator 24 and the rotor 27 move the product to the chamber 32. The vanes 33 of the rotor 27 extend into the chamber 32 to break the pumped product into segments thereby reducing the back pressure on the stator 24 which permits improved mixing with the mixing fluid. The fluid line 36 delivers mixing fluid into the conduit 35 via the fluid block 37. The mixing fluid exits the conduit 35 into the chamber 32 through the opening 39. The wall of the chamber 32 opposing the opening 39 deflects the mixing fluid rearwardly into the chamber 32 where it dislodges product from the vanes 33. The mixing fluid and product mix and then exit the chamber 32 through the outlet 38 into an appropriate container. The outlet 38 may contain a static mixer to furnish additional mixing prior to dispensing.

Figure 5:
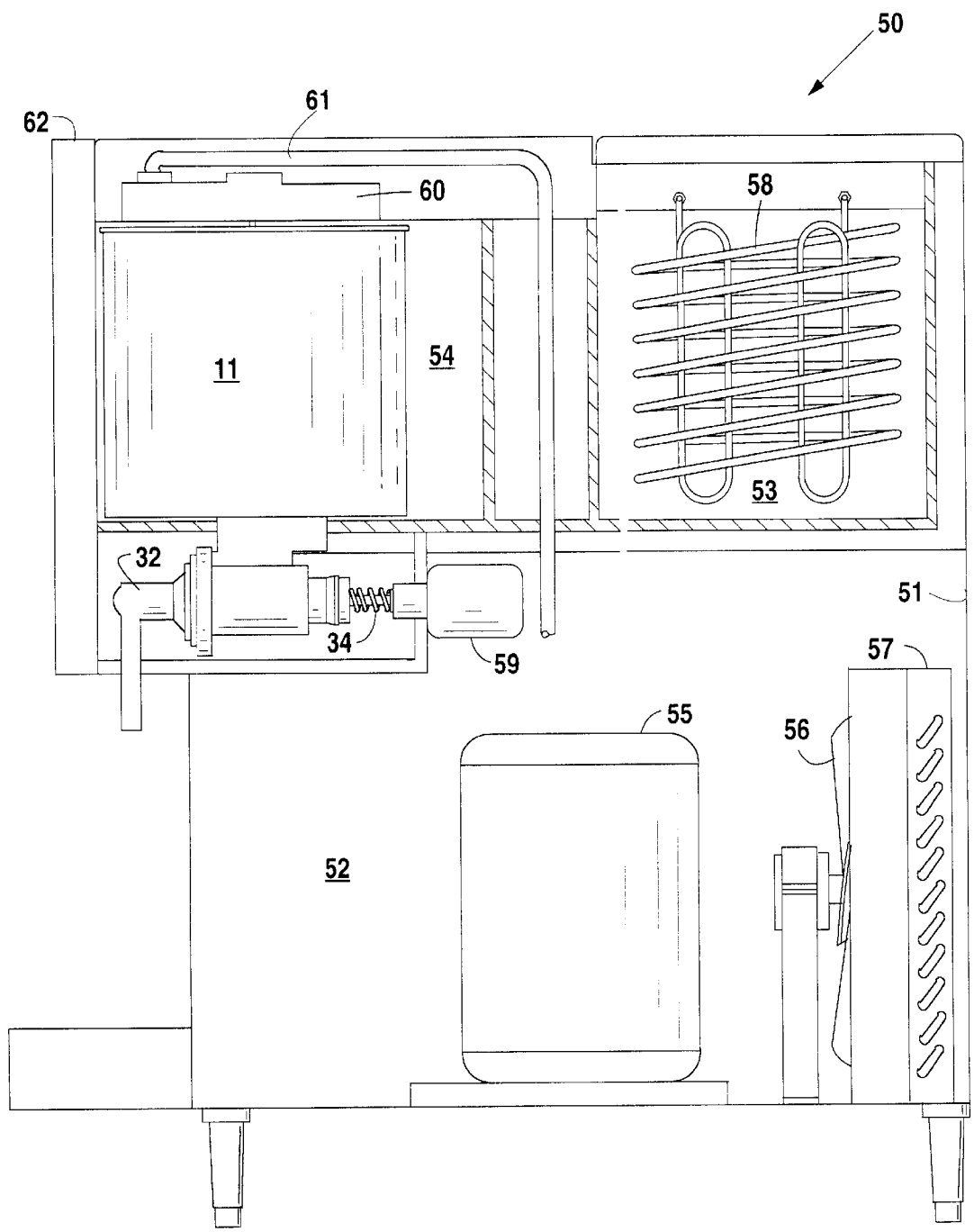
FIG. 5 is a right side elevation view in cross-section illustrating a dispenser for dispensing a frozen product.

FIG. 5 illustrates a dispenser 50 for dispensing a product requiring refrigeration such as ice cream. The dispenser 50 includes a housing 51 that contains a compartment 52, a cooling chamber 53 for holding a cooling fluid, and a canister chamber 54 including a support member therein for supporting the canister 11. The housing 51 contains a conventional refrigeration unit that consists of a compressor 55, a blower 56, and a condenser coil 57 in the compartment 52 and an evaporator coil 58 in the cooling chamber 53. The refrigeration unit operates to cool the cooling fluid within the cooling chamber 53 until the formation of a cooling fluid bank around the evaporator coil 58. The cooling chamber 53 abuts the canister chamber 54 to furnish heat exchange therebetween thereby refrigerating the canister chamber 53.

The dispenser 50 includes a motor 59 for driving the pump 12 of the package 10. The motor 59 connects to any suitable power source, such as a standard AC line, and is controlled by a switch mounted on the housing. A fluid pressure drive assembly 60 injects a pressurized fluid into the canister 11 to facilitate the driving of the piston 20. A line 61 connects to the fluid pressure drive assembly 60 and to a pressurized fluid source to deliver pressurized fluid to the fluid pressure drive assembly 60. A system user accesses the canister chamber 54 through a door 62 mounted on housing 51.

To load the dispenser 50, the door 62 is opened and the canister 11 inserted into the canister chamber 54 until the male socket member of the pump rotor shaft 34 engages a female socket in the drive shaft of the motor 59. The fluid pressure drive assembly 60 attaches over the canister 11 to pressurize the portion of the canister 11 above the piston 20. The closure of the door 59 activates the dispenser 50 which is then ready to dispense the frozen product contained in the canister 11. Upon the actuation of the motor switch, the motor 59 receives power to drive the rotor 27 thereby facilitating the dispensing of the product from the pump 12 as previously described with respect to FIGS. 1 and 2.

Figure 6:
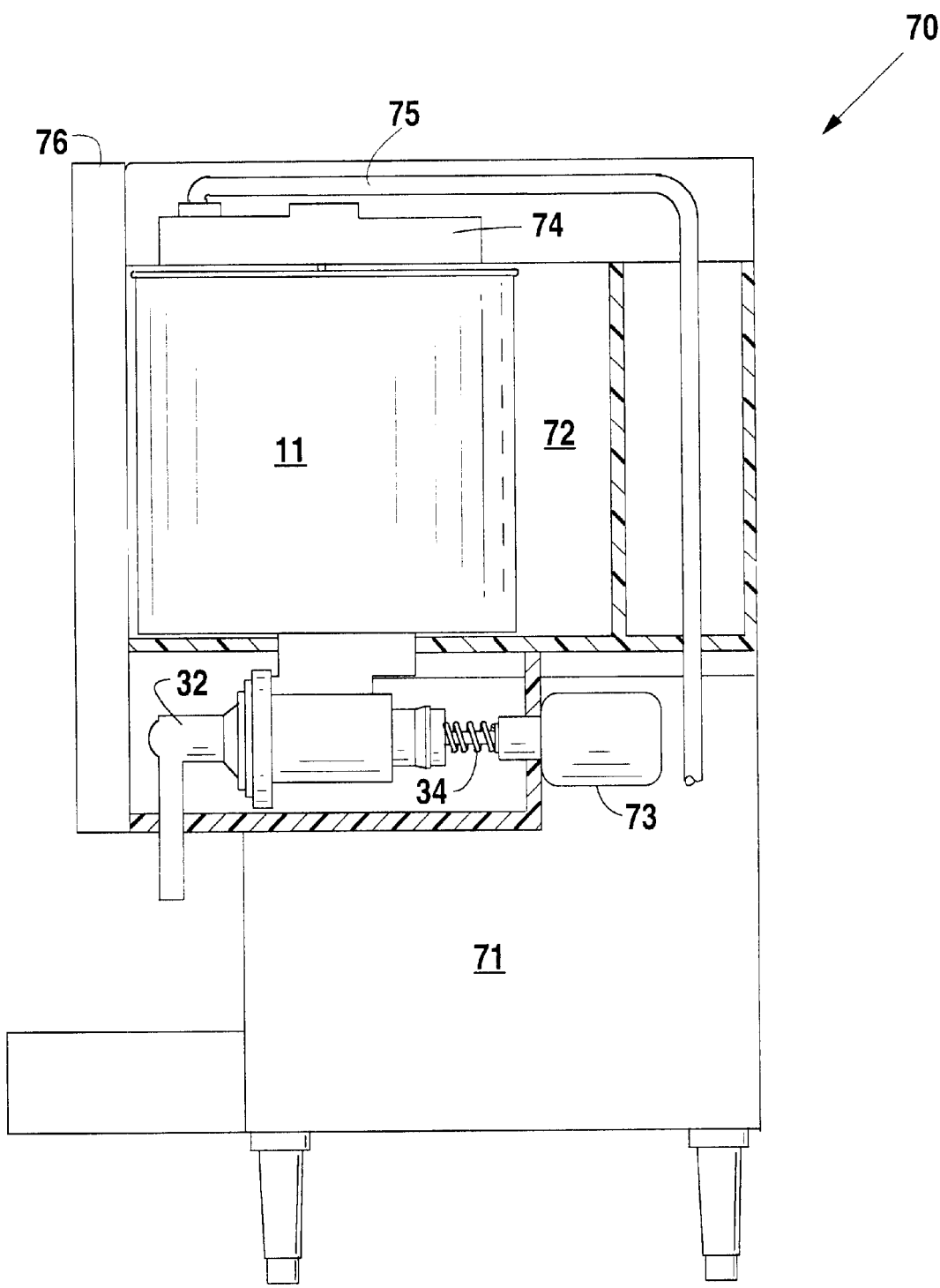
FIG. 6 is a right side elevation view in cross-section illustrating a dispenser for dispensing a product at room temperature.

FIG. 6 illustrates a dispenser 70 for dispensing a product requiring no refrigeration such as ketchup, mustard, or mayonnaise. The dispenser 70 includes a housing 71 that contains a canister chamber 72, which includes a support member therein for supporting the canister 11, and a motor 73 for driving the pump 12 of the package 10. The motor 73 connects to any suitable power source, such as a standard AC line, and is controlled by a switch mounted on the housing. A fluid pressure drive assembly 74 injects a pressurized fluid into the canister 11 to facilitate the driving of the piston 20. A line 75 connects to the fluid pressure drive assembly 74 and to a pressurized fluid source to deliver pressurized fluid to the fluid pressure drive assembly 74. A system user accesses the canister chamber 72 through a door 76 mounted on housing 71.

To load the dispenser 70, the door 76 is opened and the canister 11 inserted into the canister chamber 72 until the male socket member of the pump rotor shaft 34 engages a female socket in the drive shaft of the motor 73. The fluid pressure drive assembly 74 attaches over the canister 11 to pressurize the portion of the canister 11 above the piston 20. The closure of the door 76 activates the dispenser 70 which is then ready to dispense the product contained in the canister 11. Upon the actuation of the motor switch, the motor 73 receives power to drive the rotor 27 thereby facilitating the dispensing of the product from the pump 12 as previously described with respect to FIGS. 1 and 2.

Figure 7:
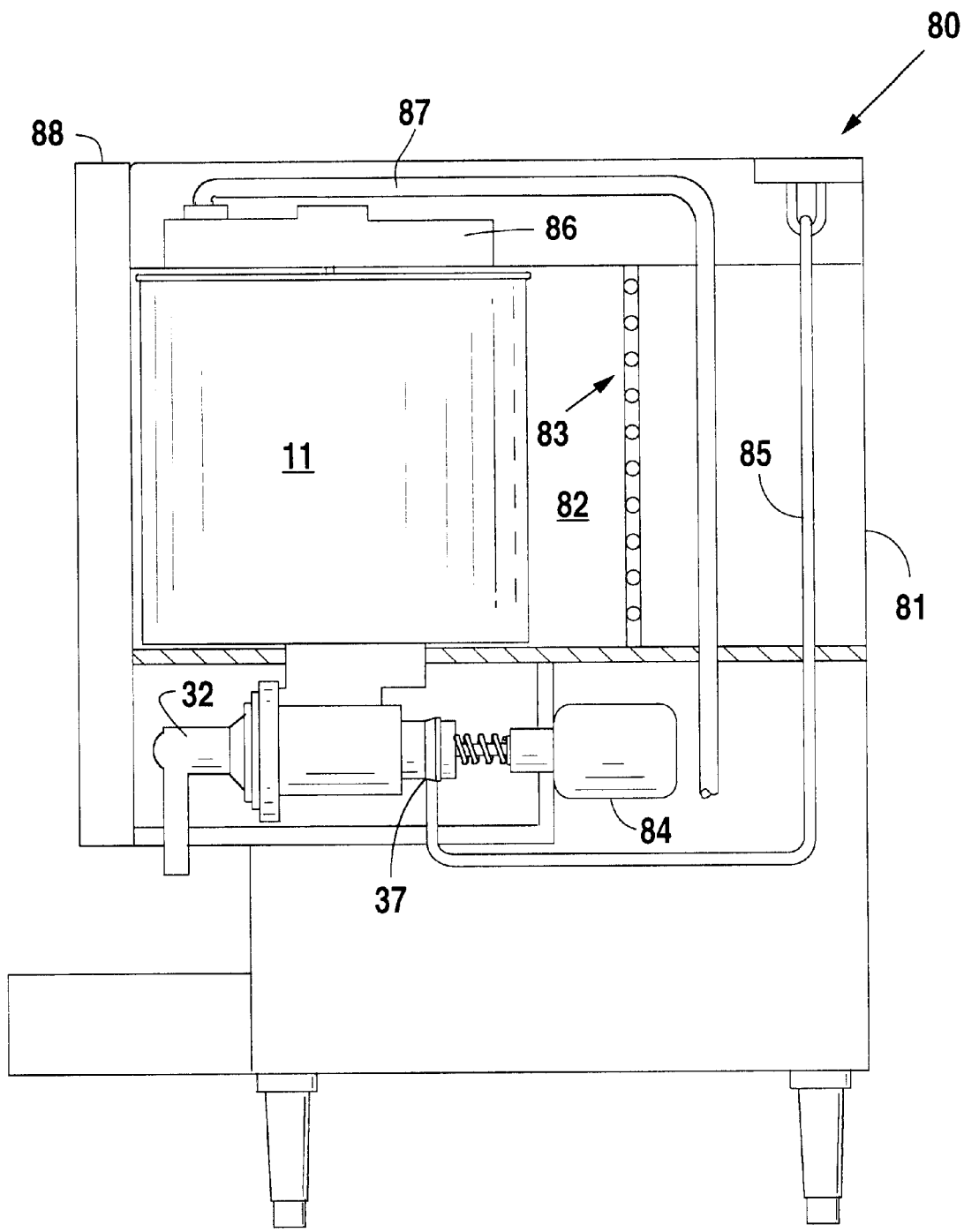
FIG. 7 is a right side elevation view in cross-section illustrating a dispenser for dispensing a heated product.

FIG. 7 illustrates a dispenser 80 for dispensing a product, such as a soup, that requires heat and further the introduction of a mixing fluid. Although the dispenser 80 will be described with both heat and water sources, one of ordinary skill in the art will recognize that the combination of both sources is not always required. The dispenser 80 includes a housing 81 that contains a canister chamber 82 including a support member therein for supporting the canister 11. The walls of the canister chamber 82 enclose a heating element 83 utilized to warm the product contained in the canister 11. In this preferred embodiment, the heating element 83 may be any suitable resistive heating element that receives power from a standard AC voltage line.

The dispenser 80 includes a motor 84 for driving the pump 12 of the package 10 and a fluid line 85 for delivering mixing fluid into the conduit 35 within the rotor 27. The fluid line 85 connects to the fluid block 37 of the pump 12 using any suitable means such as a threaded fitting and to any suitable mixing fluid source, such as a standard water line. The fluid line 85 includes a valve that controls the flow of mixing fluid to the fluid block 37. The motor 84 and the valve of the fluid line 85 connect to any suitable power source, such as a standard AC line, and are controlled by a switch mounted on the housing.

The dispenser 80 includes a fluid pressure drive assembly 86 that injects a pressurized fluid into the canister 11 to facilitate the driving of the piston 20. A line 87 connects to the fluid pressure drive assembly 86 and to a pressurized fluid source to deliver pressurized fluid to the fluid pressure drive assembly 86. A system user accesses the canister chamber 82 through a door 88 mounted on housing 81.

To load the dispenser 80, the door 88 is opened and the canister 11 inserted into the canister chamber 82 until the male socket member of the pump rotor shaft 34 engages a female socket in the drive shaft of the motor 84. The fluid pressure drive assembly 86 attaches over the canister 11 to pressurize the portion of the canister 11 above the piston 20. The mixing fluid line 85 is connected to a mixing fluid source and to the fluid block 37 on the pump 12 to deliver mixing fluid into the conduit 35 within the rotor 27. The closure of the door 88 activates the dispenser 80 which is then ready to dispense the product contained in the canister 11. Upon the actuation of the motor and valve switch, the motor 73 receives power to drive the rotor 27 and the fluid line 85 delivers mixing fluid thereby facilitating the dispensing of the mixed product from the pump 12 as previously described with respect to FIG. 4.

Figure 8:
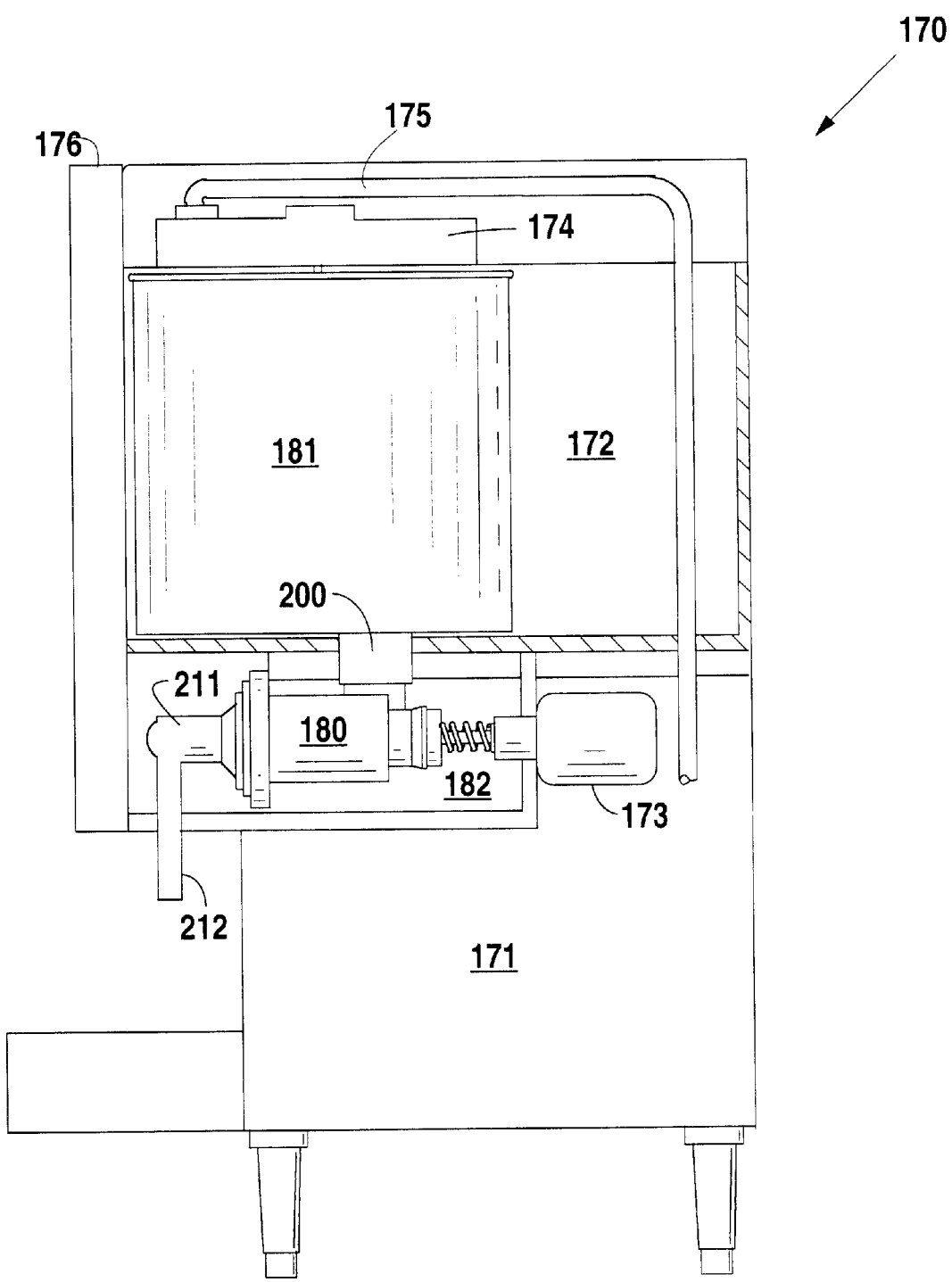
FIG. 8 is a right side elevation view in cross-section illustrating an alternative dispenser that includes a progressive cavity pump mounted therein.

FIG. 8 illustrates an alternative dispenser 170 that includes a progressive cavity pump 180 mounted therein. The dispenser 170 dispenses a product requiring no refrigeration or heating such as ketchup, mustard, or mayonnaise, however, one of ordinary skill in the art will recognize that the dispenser 170 could easily be modified to include the refrigeration unit or heating element described with reference to FIGS. 5 and 7, respectively. The dispenser 170 includes a housing 171 that contains a canister chamber 172 and a pump chamber 182. A conduit 200 attaches to the bottom wall of the canister chamber 172 to provide a support for a canister and the progressive cavity pump 180 and, further, to provide a passage for fluid communication therebetween. A motor 173 attached to the pump chamber 182 drives the pump 180 which resides within the pump chamber 182. The motor 173 connects to any suitable power source, such as a standard AC line, and is controlled by a switch mounted on the housing. A fluid pressure drive assembly 174 injects a pressurized fluid into the canister 181 to facilitate the driving of the piston 182. A line 175 connects to the fluid pressure drive assembly 174 and to a pressurized fluid source to deliver pressurized fluid to the fluid pressure drive assembly 174. A system user accesses the canister chamber 172 through a door 176 mounted on housing 171.

Figure 9:
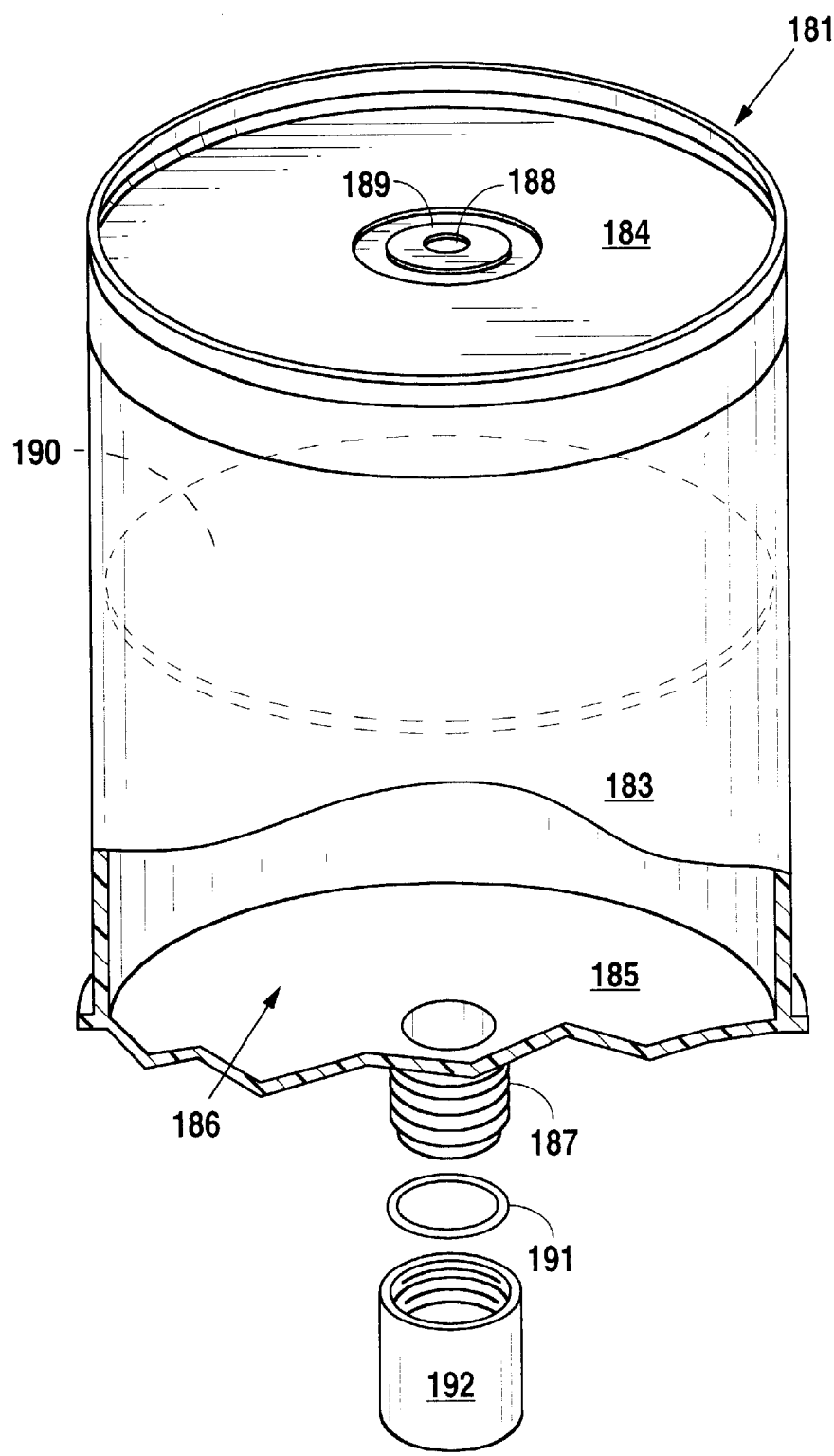
FIG. 9 is a perspective view in partial cross-section illustrating a canister for use with the alternative dispenser.

FIG. 9 illustrates a canister 181 utilized with the alternative dispenser. The canister 11 has a cylindrical side wall 183, a top wall 184, a bottom wall 185, a product chamber 186, and a product outlet 187. The canister 181 preferably includes an opening 188 in the top wall 184 thereof covered by a label 189 that may be pierced to permit the introduction of a pressurized fluid into the canister 181. The opening 188 is not essential because the fluid could alternatively be introduced through the top wall 184 after it has been punctured. The canister 181 includes a piston 190 that is forced down by the fluid pressure to push the product into the pump 180. Although canister 181 has been described with the piston 190 operated by fluid pressure, the piston 20 is not essential because the fluid pressure could be applied directly to the product. Furthermore, certain less viscous products, such as ketchup, mustard, and soup concentrate, will enter the pump 180 under the force of gravity, thus eliminating the necessity for the introduction of fluid pressure into canister 181.

In the preferred embodiments, the canister 181 is injection molded of polyethylene with a wall thickness of about 0.060 inch. The canister 181 is designed for upside-down orientation during shipping. The canister 181 is filled through the outlet 187. A seal 191 that is preferably a foil covers the outlet 187 and attaches thereto using any suitable means such as an adhesive. A cap 192 attaches to the outlet 187 to cover the seal 191 after the filling of the canister 181.

Figure 10:
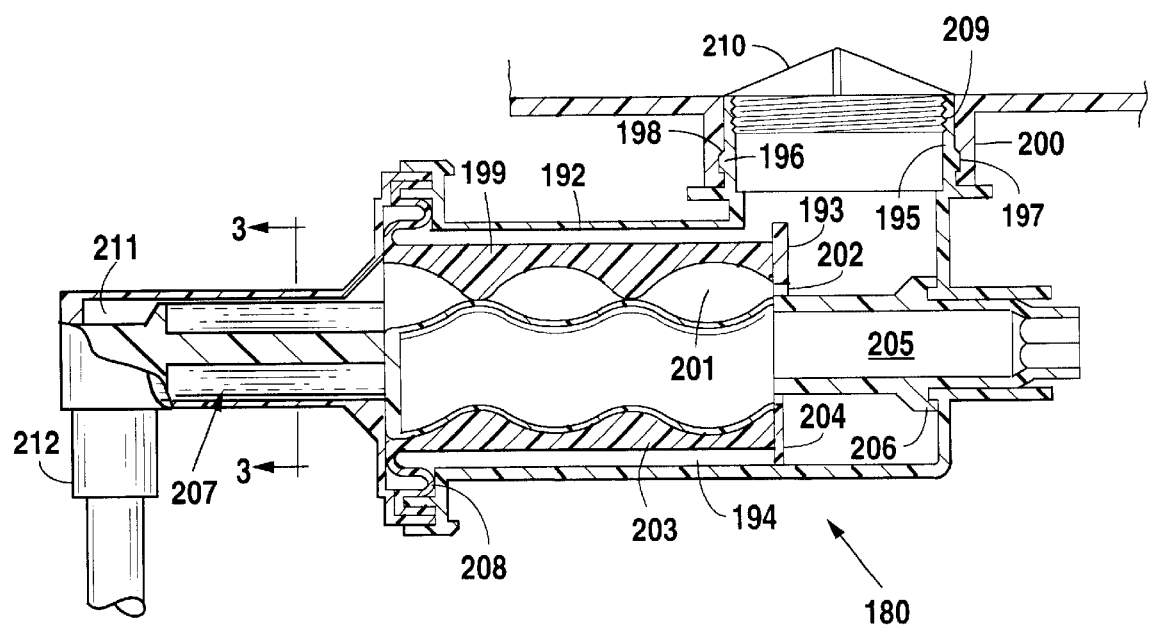
FIG. 10 is a partial right side elevation view in cross-section illustrating the mounting of a canister and a progressive cavity pump within the alternative dispenser.

FIG. 10 illustrates the progressive cavity pump 180 and the canister 181 that both mount to the conduit 200 of the dispenser 170. Although the pump 180 is a progressive cavity pump, one of ordinary skill in the art will recognize that other types of pumps may be used. Furthermore, although the pump 180 is not illustrated with a mixing fluid conduit, one of ordinary skill in the art will recognize that one similar to that described in reference to FIG. 4 could be provided.

The pump 180 includes a housing 192 having an intermediate wall 193 to define a stator chamber 194. Housing 192 includes inlet 195 that attaches to conduit 200 to suspend the progressive cavity pump 180 within the pump chamber 182. The inlet 195 of the housing 192 attaches to conduit 200 using any suitable means such as protrusions 196 and 197 that fit within a groove 198 or, alternatively, through a threaded connection.

A stator 199 abuts the wall 193 which includes an opening 201 that is a bearing for a ring 202 of a rotor 203. The ring 202 has openings or serrations 204 in its periphery that provide product inlet openings into the pump 180. The rotor 203 includes a shaft 205 having a male socket member that engages a female socket in the drive shaft of the motor 173. The rotor shaft 205 includes a labyrinth seal 206 where it rotatably extends through the housing 192. The rotor 203 further includes vanes 207 that break pumped product into segments to reduce the back pressure on the stator 199. The stator 199 moves or flexes sideways during pumping by virtue of the flexible seal 208 to avoid the necessity of an expensive constant velocity joint in the pump 180.

The conduit 200 includes threads 209 that engage the threads on outlet 187 to permit the securing of the canister 181 to the conduit 200 and thus within the canister chamber 172. For products sufficiently viscous that the upending of the canister 181 will not result in the spilling of product, the seal 191 is removed prior to the attachment of the canister 181 to the conduit 200. However, conduit 200 includes a piercing tool 210 mounted at its inlet. The piercing tool 210 includes crossed knife edges that pierce the seal 191 during the securing of the canister 181 to the conduit 200. After puncturing of the seal 191 by the piercing tool 210, the product forces the seal 191 pieces against the inner wall of the conduit 200 to prevent them from interfering with product flow.

To load the dispenser 170, the door 176 is opened and the canister 181 inserted into the canister chamber 172 as previously described to begin the delivery of product from the canister 181 to the progressive cavity pump 180 via conduit 200. The fluid pressure drive assembly 174 attaches over the canister 181 to pressurize the portion of the canister 181 above the piston 190. The piston 190 forces product into the pump 180 through the outlet 187 and conduit 200. The closure of the door 176 activates the dispenser 170 which is then ready to dispense the product contained in the canister 181. Upon the actuation of the motor switch, the motor 173 receives power to drive the rotor 203 thereby facilitating the dispensing of the product from the pump 180.

Specifically, the product enters the stator 199 through the openings or serrations 204 of the ring 202 where the rotor 203 pumps the product to a chamber 211 mounted to the pump housing 192. As the rotor 203 rotates, progressive cavities formed between the stator 199 and the rotor 203 move the product to the chamber 211. The vanes 207 of the rotor 203 extend into the chamber 211 to break the pumped product into segments thereby reducing the back pressure on the stator 199. The product exits the chamber 211 and passes into outlet 212 for dispensing into an appropriate container.

Figure 11A:
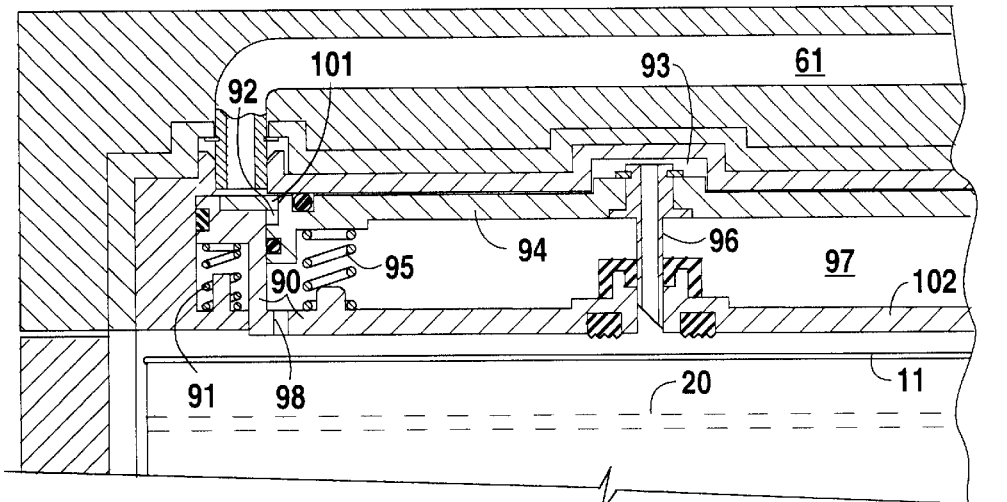
FIGS. 11A–C are partial right side elevation views in cross-section illustrating a first embodiment of an air drive assembly in an unpressurized, partially pressurized, and fully pressurized operating position.
Figure 11B:
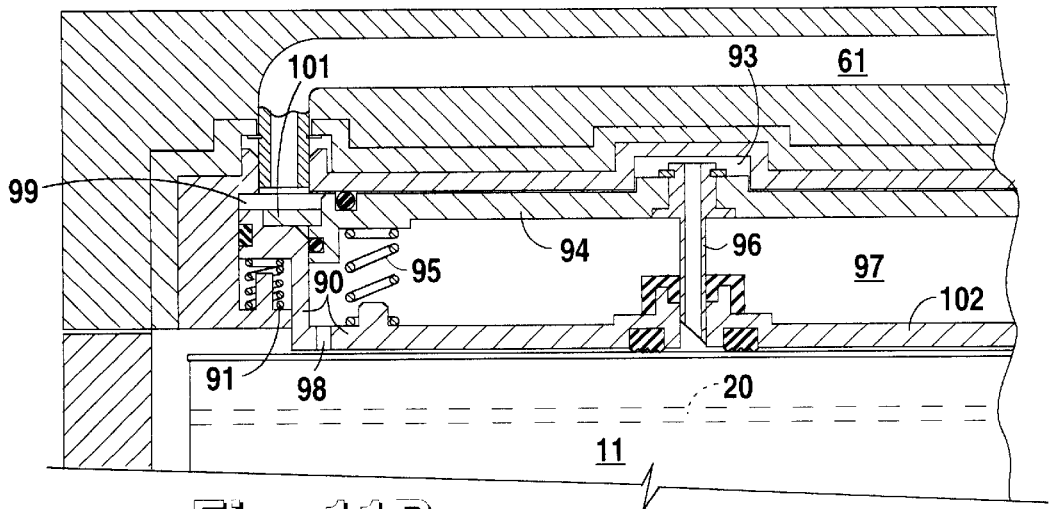
Figure 11C:
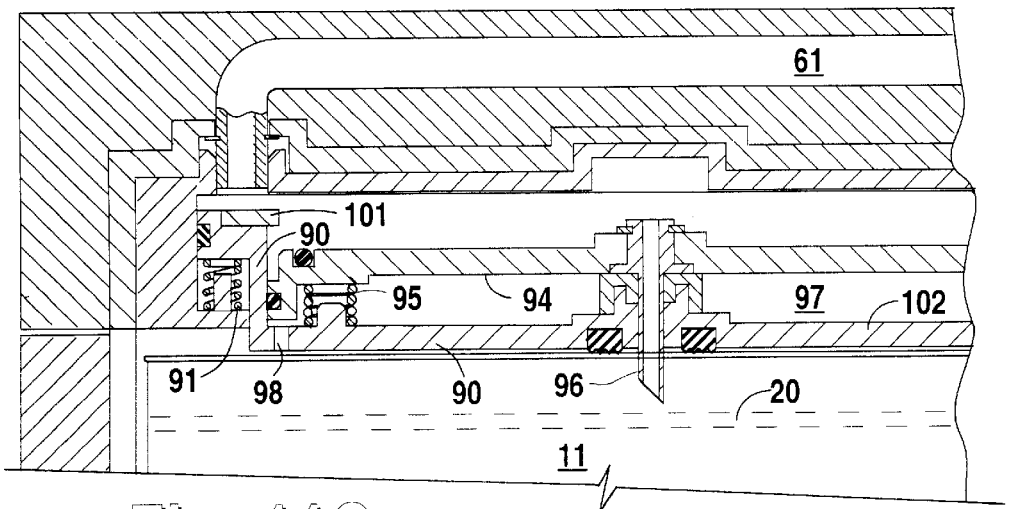

FIGS. 11A–C illustrate a first embodiment of the fluid pressure drive assembly 60 in an unpressurized, partially pressurized, and fully pressurized operating position. The fluid pressure drive assemblies 74 and 86 are identical to the fluid pressure drive assembly 60 and will therefore not be described.

The fluid pressure drive assembly 60 pressurizes the inside of the canister 11 to drive the piston 20 thereby forcing product into the pump 12. The fluid pressure drive assembly 60 receives compressed fluid from any suitable compressed fluid source, such as a compressed air tank, through the line 61. After the insertion of the canister 11 into the canister chamber 54, compressed fluid is delivered to the top of a spring assembly 90 which is movably connected to a spring 91. As the pressure increases, the spring assembly 90 compresses the spring 91 until its inner edge 101 resides in a cavity 92 and its lower plate portion 102 rests upon the top of the canister 11 (see FIG. 11B). In that position, the inner edge 101 exposes a conduit 99 communicating with a cavity 93.

Compressed fluid enters the cavity 93 via the conduit 99 to begin the compression of a spring 95 by a plate 94 of the spring assembly 90. As the pressure above the plate 94 increases, it moves downward to force any fluid contained in a cavity 97 through outlet 98, thereby reducing the resistive pressure to the downward movement of the plate 94. The fluid pressure above the plate 94 continues to increase until it overcomes the resistive force of the spring 95 and moves downward with a force sufficient for a hollow punch 96 to puncture the canister 11 (see FIG. 11c).

That puncturing allows compressed fluid to enter the canister 11 and pressurize the portion of canister 11 above the piston 20. During regular dispensing operations, the fluid pressure on the plate 94 remains at a level sufficient to maintain the springs 91 and 95 completely compressed. Furthermore, the pressure maintained above the piston 20 is sufficient for the piston 20 to force product into the pump 12.

Figure 12A:
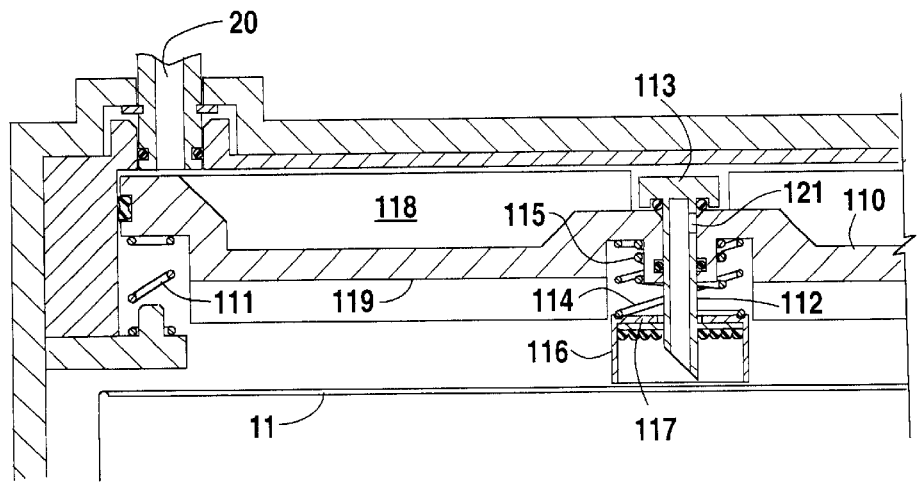
FIGS. 12A–C are partial right side elevation views in cross-section illustrating a second embodiment of the air drive assembly in an unpressurized, partially pressurized, and fully pressurized operating position.
Figure 12B:
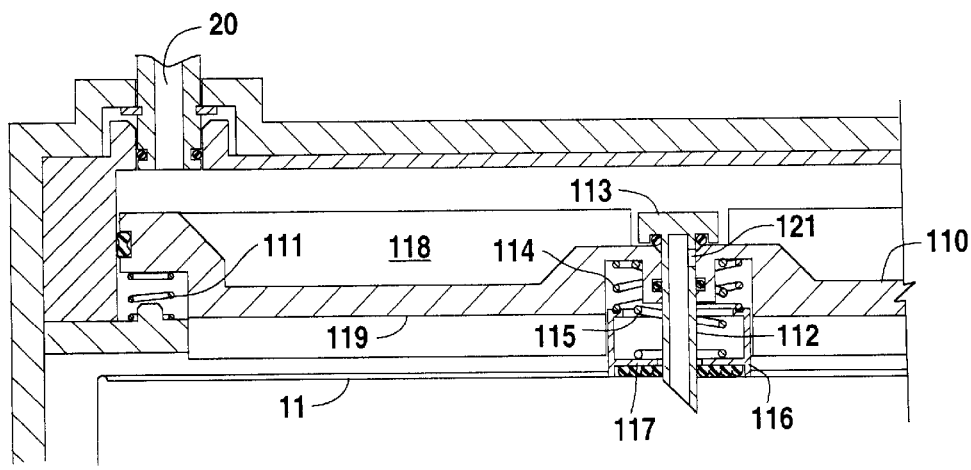
Figure 12C:
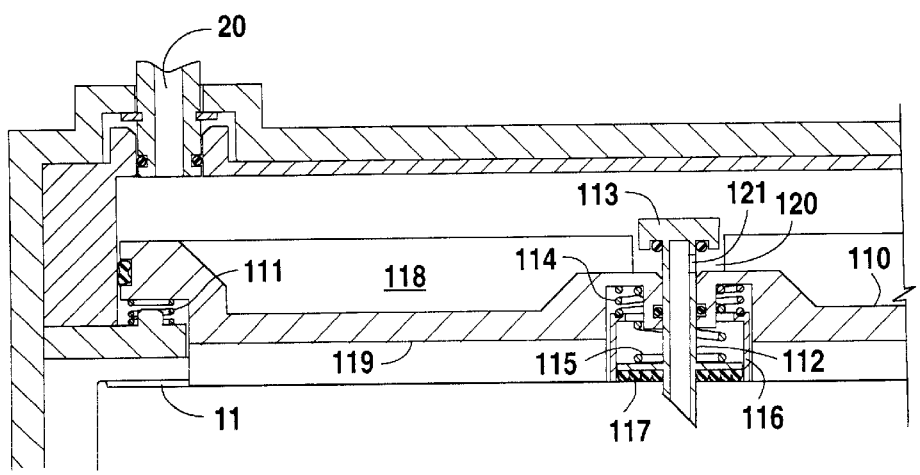

FIGS. 12A–C illustrate a second embodiment of the fluid pressure drive assembly 60 in an unpressurized, partially pressurized, and fully pressurized operating position. The fluid pressure drive assemblies 74 and 86 are identical to the fluid pressure drive assembly 60 and will therefore not be described.

The fluid pressure drive assembly 60 pressurizes the inside of the canister 11 to drive the piston 20 thereby forcing product into the pump 12. The fluid pressure drive assembly 60 receives compressed fluid from any suitable compressed fluid source such as a compressed air tank, through the line 61. After the insertion of the canister 11 into the canister chamber 54, compressed fluid is delivered to the top of a spring assembly 110 which is movably connected to a spring 111. Initially, the pressure above the spring assembly 110 increases to overcome the resistive force of the spring ill which lowers the spring assembly 110 until a punch assembly 112 punctures the canister 11 (see FIG. 12B).

The punch assembly 112 includes a hollow punch 113, a spring 114, a spring 115, and a guard 116 that are all attached to a plate portion 119 of the spring assembly 110. The guard 116 is a circular shroud about the hollow punch 113 that is attached to the lower plate portion of the spring assembly 110 by the spring 114 and used to prevent injuries due to the sharp point of the hollow punch 113. The spring 115 allows the spring assembly 110 to move relative to the guard 116, thus, allowing the hollow punch 113 to penetrate the canister 11. The spring 115 attaches to a flange 117 of the hollow punch 113 and also to the lower plate portion 119 of the spring assembly 110.

As the pressure in cavity 118 increases, the restoring force of the spring 115 is initially sufficient to maintain the head of the hollow punch 113 resting on top of the plate portion 119 of the spring assembly 60. In that position, the hollow punch 64 remains sufficiently rigid to puncture the canister 11. However, after the canister 11 has been punctured, the pressure in the cavity 118 increases until the spring ill fully compresses and the restoring force of the spring 115 is overcome, thereby creating a cavity 120 (see FIG. 12C). As the spring assembly 110 moves away from the hollow punch 113, an orifice 121 in the shaft portion of the hollow punch 113 is exposed. The orifice 121 delivers compressed fluid from the cavity 118 to the canister 11 through the hollow shaft portion of the hollow punch 64. During regular dispensing operations, the fluid pressure in the cavity 118 and also the canister 11 remains at a level sufficient for the piston 20 to force product into the pump 12.

Although the preferred embodiments disclose the use of fluid pressure to operate the piston 20 of the canister 11, one of ordinary skill in the art will readily recognize that a mechanical means such as a push rod could be substituted.

From the foregoing description and illustration of this invention, it is apparent that various modifications can be made by reconfigurations or combinations to produce similar results. It is, therefore, the desire of the Applicant not to be bound by the description of this invention as contained in this specification, but to be bound only by the claims as appended hereto.

We claim:

1. A unitary one-piece, disposable package, comprising:
    a canister for storing a product;
    a pump housing formed integrally with said canister and including an intermediate wall defining a stator chamber and an outlet chamber, said pump housing receiving product from said canister; and
    a progressive cavity pump within said pump housing for pumping product from said canister out an outlet from said outlet chamber of said pump housing, said progressive cavity pump, comprising:
        a stator within said stator chamber communicating with said outlet chamber of said pump housing, and
        a rotor within said stator, wherein said rotor includes a conduit therethrough communicating with said outlet chamber of said pump housing.

2. The unitary one-piece, disposable package according to claim 1 wherein said canister includes a fill opening and a fill cap for said fill opening.

3. The unitary one-piece, disposable package according to claim 1 wherein said canister includes a means for forcing product into said pump housing.

4. The unitary one-piece, disposable package according to claim 1 wherein said rotor includes a shaft connectable to a motor shaft.

5. A unitary one-piece, disposable package, comprising:
    a canister for storing a product;
    a pump housing formed integrally with said canister and including an intermediate wall defining a stator chamber and an outlet chamber, said pump housing receiving product from said canister; and
    a progressive cavity pump within said pump housing for pumping product from said canister out an outlet from said outlet chamber of said pump housing, said Progressive cavity pump, comprising:
        a stator within said stator chamber communicating with said outlet chamber of said pump housing, and
        a rotor within said stator, wherein said rotor includes vanes [at an end opposite to said shaft of said rotor, said vanes] extending into said outlet chamber of said pump housing.

6. The unitary one-piece, disposable package according to claim 5 wherein said rotor includes a shaft connectable to a motor drive shaft.

7. A product dispenser, comprising:
    a canister that stores product;
    a housing;
    a pump chamber in said housing for receiving a pump;
    a canister chamber in said housing for receiving said canister that stores a product,
    said canister chamber providing communication of product from said canister to said pump chamber;
    a progressive cavity pump mounted within said pump chamber for pumping product from said canister out an outlet from said pump chamber; and
    means within said housing for driving said progressive cavity pump.

8. The product dispenser according to claim 7 further comprising means within said housing for refrigerating said canister chamber.

9. The product dispenser according to claim 7 further comprising means within said housing for heating said canister chamber.

10. The product dispenser according to claim 7 further comprising means within said housing for forcing product from said canister into said pump chamber.

11. The product dispenser according to claim 7 further comprising means for piercing'said seal to permit product flow from said canister to said progressive cavity pump.

12. The product dispenser according to claim 7 wherein said canister includes a fill opening and a fill cap for said fill opening.

13. The product dispenser according to claim 12 wherein a seal is secured over said fill opening after the filling of said canister.

14. The product dispenser according to claim 7 wherein said progressive cavity pump includes a pump housing having an intermediate wall defining a stator chamber.

15. The product dispenser according to claim 14 wherein said pump housing includes an outlet chamber mounted thereto.

16. The product dispenser according to claim 15 wherein said progressive cavity pump comprises a stator within said stator chamber communicating with said outlet chamber.

17. The product dispenser claim 16 wherein said progressive cavity pump comprises a rotor within said stator.

18. The product dispenser according to claim 17 wherein said rotor includes a shaft connectable to said means for driving said progressive cavity pump.

19. The product dispenser according to claim 17 wherein said rotor includes a conduit therethrough communicating with said outlet chamber of said pump housing.

20. The product dispenser according to claim 19 further comprising means connected to said conduit through said rotor for delivering a mixing fluid therein.

21. The product dispenser according to claim 17 wherein said rotor includes vanes extending into said outlet chamber of said pump housing.

* * * * *